US010839109B2

(12) United States Patent
Bush et al.

(10) Patent No.: US 10,839,109 B2
(45) Date of Patent: Nov. 17, 2020

(54) INTEGRATED CIRCUIT (IC) PORTHOLES AND RELATED TECHNIQUES

(71) Applicant: Massachusetts Institute of Technology, Cambridge, MA (US)

(72) Inventors: Kevin B. Bush, Sudbury, MA (US); Matthew D. Hicks, Blacksburg, VA (US); Timothy D. Trippel, Mishawaka, IN (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/597,013

(22) Filed: Oct. 9, 2019

(65) Prior Publication Data
US 2020/0152561 A1  May 14, 2020

Related U.S. Application Data

(60) Provisional application No. 62/801,698, filed on Feb. 6, 2019, provisional application No. 62/792,012, filed on
(Continued)

(51) Int. Cl.
*G06F 21/86* (2013.01)
*G06F 21/87* (2013.01)
(Continued)

(52) U.S. Cl.
CPC .............. *G06F 21/86* (2013.01); *G06F 21/56* (2013.01); *G06F 21/70* (2013.01); *G06F 21/71* (2013.01);
(Continued)

(58) Field of Classification Search
CPC .......... G06F 21/86; G06F 21/87; G06F 21/88; G06F 21/70; G06F 21/71; G06F 21/73;
(Continued)

(56) References Cited

U.S. PATENT DOCUMENTS

| 6,251,773 B1 | 6/2001 | Hartswick et al. |
| 2003/0218475 A1 | 11/2003 | Gammel |

(Continued)

OTHER PUBLICATIONS

Adato et al., "Rapid Mapping of Digital Integrated Circuit Logic Gates Via Multi-Spectral Backside Imaging;" Article from Physics Optics (arXiv:1605.09306v1); May 30, 2016; 24 Pages.
(Continued)

*Primary Examiner* — Feifei Yeung Lopez
(74) *Attorney, Agent, or Firm* — Daly, Crowley, Mofford & Durkee, LLP

(57) ABSTRACT

An integrated circuit (IC) structure includes a device layer including a security-critical wire and a metal layer disposed over the device layer. The metal layer includes at least one wire and an IC porthole. The IC porthole has a perimeter that defines a shape such that, when the perimeter of the IC porthole is projected onto the device layer, the projection of the IC porthole perimeter includes at least a segment of the security-critical wire, and the at least one wire in the metal layer does not overlap the security-critical wire within the projection of the IC porthole perimeter to thereby allow post-fabrication optical inspection of the security-critical wire through the IC porthole.

20 Claims, 7 Drawing Sheets

Related U.S. Application Data on Jan. 14, 2019, provisional application No. 62/767,288, filed on Nov. 14, 2018.

(51) Int. Cl.

| | |
|---|---|
| H01R 43/28 | (2006.01) |
| H01L 23/00 | (2006.01) |
| H01L 23/538 | (2006.01) |
| H01L 23/498 | (2006.01) |
| H01L 23/552 | (2006.01) |
| G06F 21/71 | (2013.01) |
| G06F 21/73 | (2013.01) |
| G06F 21/88 | (2013.01) |
| G06F 21/70 | (2013.01) |
| H04L 29/06 | (2006.01) |
| H04L 9/00 | (2006.01) |
| H04N 21/442 | (2011.01) |
| G06F 21/56 | (2013.01) |
| H04W 12/12 | (2009.01) |
| H04M 3/22 | (2006.01) |

(52) U.S. Cl.
CPC .............. *G06F 21/73* (2013.01); *G06F 21/87* (2013.01); *G06F 21/88* (2013.01); *H01L 23/49822* (2013.01); *H01L 23/49838* (2013.01); *H01L 23/5386* (2013.01); *H01L 23/552* (2013.01); *H01L 23/576* (2013.01); *H01R 43/28* (2013.01); *H04L 9/002* (2013.01); *H04L 29/06877* (2013.01); *H04L 63/14* (2013.01); *H04L 63/145* (2013.01); *H04L 63/1441* (2013.01); *H04M 3/2281* (2013.01); *H04N 21/44236* (2013.01); *H04W 12/1208* (2019.01); *H01L 2224/05568* (2013.01); *Y10S 707/952* (2013.01)

(58) Field of Classification Search
CPC ............... G06F 21/56; H01L 23/49822; H01L 23/49838; H01L 23/5386; H04L 29/06877; H04L 63/14; H04L 63/145; H04L 9/002; H04L 63/1441; H04W 12/1208; H04M 3/2281; H04N 21/44236; Y10S 707/952

See application file for complete search history.

(56) References Cited

U.S. PATENT DOCUMENTS

| | | |
|---|---|---|
| 2010/0031064 A1 | 2/2010 | Walmsley |
| 2011/0002528 A1 | 1/2011 | Bajura et al. |
| 2011/0026806 A1 | 2/2011 | Bernstein et al. |
| 2012/0033810 A1 | 2/2012 | Devadas et al. |
| 2013/0312122 A1 | 11/2013 | Arora et al. |
| 2016/0098561 A1 | 4/2016 | Keller et al. |
| 2018/0211377 A1 | 7/2018 | Bahgat Shehata et al. |
| 2020/0266150 A1* | 8/2020 | Kim .................... H01L 23/5386 |

OTHER PUBLICATIONS

Agrawal et al., "Trojan Detection using IC Fingerprinting;" IEEE Symposium on Security and Privacy (SP'07); May 20, 2007; 15 Pages.

Ba et al., "Hardware Trojan Prevention using Layout-Level Design Approach;" 2015 European Conference on Circuit Theory and Design (ECCTD); Aug. 24, 2015; 4 Pages.

Ba et al., "Hardware Trust through Layout Filling: a Hardware Trojan Prevention Technique;" IEEE Computer Society Annual Symposium on VLSI; Jul. 19, 2016; 6 Pages.

Balasch, "Electromagnetic Circuit Fingerprints for Hardware Trojan Detection;" 2015 IEEE International Symposium on Electromagnetic Compatibility (EMC); Aug. 16, 2015; 6 Pages.

Beaumont et al., Hardware Trojans—Prevention, Detection, Countermeasures (A Literature Review); DSTO-TN-1012; Defence Science and Technology Organisation Edinburgh (Australia) Command Control Communications and Intelligence Division; Jul. 2011; 50 Pages.

Becker et al., "Stealthy Dopant-Level Hardware Trojans;" Journal of Cryptographic Engineering, vol. 4, No. 1; Aug. 20, 2013; pp. 19-31; 18 Pages.

C.D. Systems, "Layer Map Files;" Retrieved from http://www-bsac.eecs.berkely.edu/~cadence/tools/layermap.html on May 10, 2019; 1 Pages.

C.D. Systems, "LEF/DEF Language Reference;" Product Version 5.7, Retrieved from http://www.ispd.cc/contests/14/web/doc/lefdefref.pdf; Nov. 2009; 414 Pages.

Cakir et al., "Hardware Trojan Detection for Gate-level ICs Using Signal Correlation Based Clustering;" Proceedings of the Design, Automation & Test in Europe Conference and Exhibition; Mar. 9, 2015; 6 Pages.

Calma Company, "GDSII™ Stream Format Manual;" Documentation No. B97E060, Release 6.0; Feb. 1987; 47 Pages.

Chakraborty et al., "Hardware Trojan: Threats and Emerging Solutions;" IEEE International High Level Design Validation and Test Workshop (HLDVT); Nov. 4, 2009; 6 Pages.

Cocchi et al., "Circuit Camouflage Integration for Hardware IP Protection;" 2014 51st ACM/EDAC/IEEE Design Automation Conference (DAC); Jun. 1, 2014; 5 Pages.

Ellson et al., "Graphviz and Dynagraph—Static and Dynamic Graph Drawing Tools;" Graph Drawings Software; Part of the Mathematics and Visualization book series (MATHVISUAL); Jan. 2004; pp. 127-148; 23 Pages.

Elmore, "Transient Response of Damped Linear Network with Particular Regard to Wideband Amplifiers;" Journal of Applied Physics, vol. 19, No. 1; United States Atomic Energy Commission, Oak Ridge, Tennessee; Mar. 26, 1947; 24 Pages.

Forte, "Temperature Tracking: An Innovative Run-Time Approach for Hardware Trojan Detection;" 2013 IEEE/ACM International Conference on Computer-Aided Design (ICCAD); Nov. 18, 2013; 7 Pages.

Github, https://github.com/mit-II/CEP Webpage accessed and printed on Oct. 7, 2019; Common Evaluation Platform; 1 page.

Github, https://github.com/openrisc/or1200 Webpage accessed and printed on Oct. 7, 2019; Common Evaluation Platform; 1 Page.

Goldstein et al., "Scoap: Sandia Controllability/Observability Analysis Program;" Proceedings of the $17^{th}$ ACM Design Automation Conference (DAC); Jun. 23, 1980; 7 Pages.

Hicks et al., "Overcoming an Untrusted Computing Base: Detecting and Removing Malicious Hardware Automatically;" Proceedings of the $31^{st}$ IEEE Symposium on Security & Privacy; May 2010; 14 Pages.

Hicks, et al., "SPECS: A Lightweight Runtime Mechanism for Protecting Software from Security-Critical Processor Bugs;" International Conference on Architectural Support for Programming Languages and Operating Systems (ASPLOS); Mar. 14, 2015; pp. 517-529; 13 Pages.

Hughes et al., "Computer Graphics: Principles and Practice;" Third Edition; Pearson Education; Jul. 2013; 184 Pages.

IEEE Computer Society, "IEEE Standard Verilog® Hardware Description Language;" IEEE Standards (IEEE Std 1364-2001); Sep. 28, 2001; 791 Pages.

Intel Corporation, "Microprocessor Quick Reference Guide;" Retrieved from https://www.intel.com/pressroom/kits/quickreffam.htm on May 10, 2019; 32 Pages.

Jin et al., "DFTT: Design for Trojan Test;" IEEE International Conference on Electronics, Circuits, and Systems (ICECS); Dec. 12, 2010; 6 Pages.

Jin et al., "Hardware Trojan Detection Using Path Delay Fingerprint" 2008 IEEE International Workshop on Hardware-Oriented Security and Trust; Jun. 9, 2008; 7 Pages.

(56) References Cited

OTHER PUBLICATIONS

King et al., "Designing and Implementing Malicious Hardware;" Proceedings of the Usenix Workshop on Large-Scale Exploits and Emergent Threats (LEET); Apr. 15, 2008; 8 Pages.

Kumar et al., "Parametric Trojans for Fault-Injection Attacks on Cryptographic Hardware;" Workshop on Fault Diagnosis and Tolerance in Cryptography (FDTC); Sep. 23, 2014; 11 Pages.

Li et al., "At-Speed Delay Characterization for IC Authentication and Trojan Horse Detection;" 2008 IEEE International Workshop on Hardware-Oriented Security and Trust; Jun. 9, 2008; 7 pages.

Lin et al., "Trojan Side-Channels: Lightweight Hardware Trojans through Side-Channel Engineering;" International Workshop on Cryptographic Hardware and Embedded Systems (CHES); Sep. 2009; 14 Pages.

Narasimhan et al., "TeSR: A Robust Temporal Self-Referencing Approach for Hardware Trojan Detection;" IEEE International Symposium on Hardware-Oriented Security and Trust (HOST); Jun. 5, 2011; 4 Pages.

Potkonjak et al., "Hardware Trojan Horse Detection Using Gate-Level Characterization;" 2009 46th ACM/IEEE Design Automation Conference; Jul. 26, 2009; 6 Pages.

PyPy, "PyPy;" Retrieved from https://pypy.org/ on May 14, 2019; 13 Pages.

Robertson et al., "The Big Hack: How China Used a Tiny Chip to Infiltrate U.S. Companies;" Bloomberg Businessweek; Oct. 4, 2018; 25 Pages.

Rostami et al., "Hardware Security: Threat Models and Metrics;" IEEE/ACM International Conference on Computer-Aided Design (ICCAD); Nov. 18, 2013; 5 Pages.

Salmani et al., "Analyzing Circuit Vulnerability to Hardware Trojan Insertion at the Behavioral Level;" 2013 IEEE International Symposium on Defect and Fault Tolerance in Vlsi and Nanotechnology Systems (DFTS); Oct. 2, 2013; 6 Pages.

Salmani, "COTD: Reference-Free Hardware Trojan Detection and Recovery Based on Controllability and Observability in Gate-Level Netlist;" IEEE Transactions on Information Forensics and Security (vol. 12, Issue: 2); Feb. 2017; 13 Pages.

Salmani et al., "On Design Vulnerability Analysis and Trust Benchmarks Development;" $31^{st}$ IEEE International Conference on Computer Design (ICCD); Oct. 6, 2013; 4 Pages.

Shiyanovskii et al., "Process Reliability Based on Trojans through NBTI and HCI effects;" 2010 NASA/ESA Conference on Adaptive Hardware and Systems; Jun. 15, 2010; 8 Pages.

Solid State Technology, "Why Node Shrinks are No Longer Offsetting Equipment Costs;" Retrieved from https://electoiq.com/2012/10/why-node-shrinks-are-no-longer-offsetting-equipment-costs/; Blog from Oct. 24, 2012; 4 Pages.

Tehranipoor et al., "A Survey of Hardware Trojan Taxonomy and Detection;" IEEE Design & Test of Computers, vol. 27, Issue 1; Feb. 5, 2010; 16 Pages.

Trippel et al., "An Extensible Framework for Quantifying the Coverage of Defenses Against Untrusted Foundries;" https://arxiv.org/abs/1906.08836; Jun. 20, 2019; 17 Pages.

Waksman et al., "FANCI: Identification of Stealthy Malicious Logic Using Boolean Functional Analysis;" Proceedings of the ACM SIGSAC Conference on Computer & Communication Security (CCS); Nov. 4, 2013; 12 Pages.

Wang et al., "Detecting Malicious Inclusions in Secure Hardware: Challenges and Solutions;" IEEE International Workshop on Hardware-Oriented Security and Trust (HOST); Jul. 2008; 8 Pages.

Weiler et al., "Hidden Surface Removal Using Polygon Area Sorting;" SIGGRAPH '77 Proceedings of the 4th Annual Conference on Computer Graphics and Interactive Techniques; Jul. 20, 1977; 9 Pages.

Williams, "Icarus Verilog;" Retrieved from http://iverilog.icarus.com/ on May 10, 2019; 3 Pages.

Wolff et al., "Towards Trojan-Free Trusted ICs: Problem Analysis and Detection Scheme;" Proceedings of the ACM Conference on Design, Automation and Test in Europe; Mar. 10, 2008; 4 Pages.

Xiao et al., "BISA: Built-In Self-Authentication for Preventing Hardware Trojan Insertion" 2013 IEEE International Symposium on Hardware-Oriented Security and Trust (HOST), Jun. 2, 2013; 6 Pages.

Yang et al., "A2: Analog Malicious Hardware;" IEEE Symposium on Security and Privacy (SP); May 22, 2016; 20 Pages.

Zhang et al., "VeriTrust: Verification for Hardware Trust;" $50^{th}$ ACM/EDAC/IEEE Design Automation Conference (DAC); May 29, 2013; 8 Pages.

Zhou et al., "Detecting Hardware Trojans Using Backside Optical Imaging of Embedded Watermarks;" Proceedings of $52^{nd}$ ACM/EDAC/IEEE Design Automation Conference (DAC); Jun. 7, 2015; 6 Pages.

U.S. Appl. No. 16/598,293, filed Oct. 10, 2019, Bush, et al.

PCT International Search Report and Written Opinion dated Jan. 3, 2020 for International Application No. PCT/US2019/058254; 11 Pages.

PCT International Search Report and Written Opinion dated Jan. 3, 2020 for International Application No. PCT/US2019/058254; 12 Pages.

PCT International Search Report and Written Opinion dated Jan. 15, 2020 for International Application No. PCT/US2019/058255; 16 Pages.

* cited by examiner

INTEGRATED CIRCUIT (IC) PORTHOLES AND RELATED TECHNIQUES

CROSS-REFERENCE TO RELATED APPLICATIONS

This application claims the benefit of and priority to U.S. Provisional Application No. 62/767,288, filed on Nov. 14, 2018, U.S. Provisional Application No. 62/792,012, filed on Jan. 14, 2019 and U.S. Provisional Application No. 62/801,698, filed on Feb. 6, 2019, each of which is herein incorporated by reference in its entirety.

STATEMENT REGARDING FEDERALLY SPONSORED RESEARCH

This invention was made with government support under Grant No. FA8702-15-D-0001 awarded by the U.S. Air Force. The government has certain rights in the invention.

FIELD

This disclosure relates generally to integrated circuit (IC) fabrication, and more particularly, to an IC structure and technique for detecting manipulations in an IC.

BACKGROUND

Since the inception of the integrated circuit (IC), the transistors and wires used to construct them have continued to shrink. While this shrinkage improves performance and density, it reduces trust. For example, increasing costs to build leading-edge integrated circuit (IC) fabrication facilities has resulted in the need for companies and even nation states to outsource the fabrication of high-performance ICs. However, outsourcing IC fabrication presents security threats including unauthorized fabrication-time modifications (sometimes referred to as "hardware trojans").

To detect hardware trojans post IC fabrication optical inspection techniques may be used. Such post-fabrication optical inspection techniques include focused ion beam (FIB) and/or scanning electron microscope (SEM) techniques. However, conventional IC designs include many layers of overlapping electrical interconnects making it challenging to conduct post-fabrication optical inspection of specific interconnects (e.g., wires).

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with an embodiment, an integrated circuit (IC) structure includes a device layer having a security-critical wire disposed thereon and a metal layer disposed over the device layer. The metal layer is provided having an opening therein. The opening is arranged above at least a segment of the security-critical wire.

With this particular arrangement, an IC structure which facilitates optical inspection of one or more security-critical signal paths is provided.

In embodiments, one or more translucent layers (e.g. optically translucent dielectric layers) may be disposed between the device later and the metal layer. As used herein, the translucent layer refers to a layer in an integrated circuit (IC) structure that allows light to pass though the layer.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 2 also illustrates a plan view of a section of the IC die including multiple IC portholes having varying wire widths and porthole widths, in accordance with an embodiment of the present disclosure.

DETAILED DESCRIPTION

Figure 1:
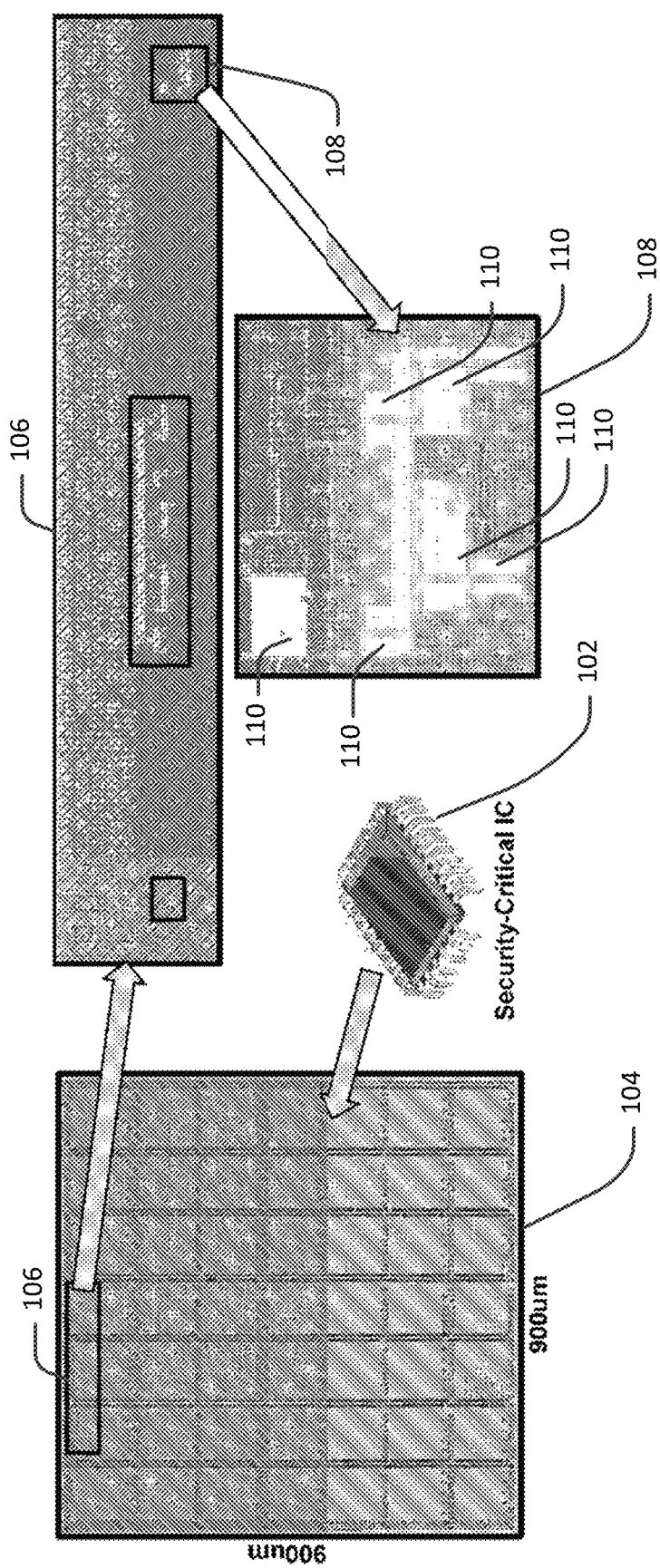
FIG. 1 illustrates plan views of an example integrated circuit (IC) die having a trojan rogue wire connection observable through an IC porthole using post-fabrication optical inspection, in accordance with an embodiment of the present disclosure.

Concepts and techniques are disclosed that enable non-destructive and efficient post-fabrication optical inspection of wires or so-called interconnects within a multi-layer integrated circuit (IC). As will be appreciated in light of this disclosure, the techniques can be implemented using the concept of an IC porthole. Having determined or otherwise given a wire in an IC to be inspected post-fabrication, such as a security-critical wire, an IC porthole can be defined to allow for post-fabrication inspection of the wire or a segment of the wire. The defined IC may have a perimeter that defines a shape. The IC porthole can be defined during the place-and-route phase of an IC design workflow. Then, in designing the IC, the wire is routed such that the segment of the wire within a projection of the perimeter of the IC porthole does not overlap any other wires, components, or metal fill. Post-fabrication of the IC, the IC porthole can be non-destructively imaged to determine whether the portholed wire (e.g., the wire or segment of the wire appearing within the projection of the IC porthole perimeter) has been manufactured to specification. Note that an IC porthole is not a physical hole within the IC or a layer of the IC. Rather, the IC porthole has a perimeter that defines a shape such that, when the perimeter of the IC porthole is projected onto a device layer of the IC, other than the wire of interest, no other wires, components, or metal fill are routed and/or placed above and/or below the wire of interest within the projection of the IC porthole in the design of the IC. Also note that the projection of the perimeter of an IC porthole can include an entire wire or a segment of the wire, such as a critical segment of the wire.

As noted above, there are a number of non-trivial and unresolved issues associated with post-fabrication detection of fabrication-time attacks to an IC. Post-fabrication detection techniques attempt to search for unwanted modifications to a circuit design post-fabrication. However, post-fabrication techniques become more challenging as device dimensions continue to scale down, increasing the size and complexity of IC designs. In such complex designs, stealthy hardware trojans, which may include only one or two additional circuit components, can be hidden in the sea of millions and, in some cases, billions of circuit components, yet have a significant impact on the overall state of the circuit.

Thus, and in accordance with one embodiment, techniques are provided for forming IC portholes in an IC for post-fabrication optical inspection of wires within an IC. In some embodiments, an IC porthole is formed or otherwise generated to facilitate post-fabrication optical inspection of a security-critical wire within the IC. As used herein, the term "security-critical wire" refers to a wire within an IC that is likely to be a target of an IC fabrication time attack, such as by a hardware trojan or other malicious modification to the circuitry of the IC. For example, a security-critical wire is a wire within the IC to which a rogue hardware trojan wire would attach to. In some example cases, a security-critical wire connects or operatively couples security-critical components in the IC. In one specific embodiment, a security-critical wire within an IC design is identified. The components connected to the security-critical wire are then positioned where route-densities are relatively low in the IC design, such as towards the out-skirts of an IC die. An IC porthole having a perimeter that defines a shape can be defined such that, when the perimeter of the IC porthole is projected onto a device layer, the projection of the IC porthole perimeter includes at least a segment of the security-critical wire in the IC design. The security-critical wire can then be routed such that, within the projection of the defined IC porthole perimeter, the security-critical wire does not overlap any other wires, components, or metal fill in the IC design. In some embodiments, the projection of the IC porthole perimeter may include the entire security-critical wire. In any case, the remaining components and wiring within the IC design are positioned and/or routed such that they do not overlap the security-critical wire within the projection of the IC porthole perimeter. It will be appreciated in light of this disclosure that an IC design can include multiple IC portholes. It will also be appreciated in light of this disclosure that a projection of a perimeter of an IC porthole can include one or more security-critical wires and, in some cases, segments or portions of one or more security-critical wires.

In some example embodiments, the size of the security-critical wires within a projection of an IC porthole perimeter can be increased. Increasing the size of the security-critical wires, such as the widths of the security-critical wires, may allow for or otherwise assist in the post-fabrication optical inspection of such security-critical wires. Additionally or alternatively, the spacing around the security-critical wires within a projection of an IC porthole perimeter can be increased. Similar to increasing the size of a security-critical wire, increasing the spacing around a security-critical wire may assist in the post-fabrication optical inspection of the security-critical wire.

In other embodiments, a security-critical wire within a projection of an IC porthole perimeter can be surrounded with device placement and routing blockage constraints. Device placement blockage constraints may define "keep-out" zones on the device layer, and routing blockage constraints may define "keep-out" zones on the routing metal layers. Such device placement and routing blockage constraints may further enhance security of the security-critical wire. Numerous configurations and modifications will be apparent in light of this disclosure.

It is noted that designations such "above" or "below" or "top" or "bottom" or "top side" or "bottom side" are not intended to necessarily implicate a limitation as to orientation of the embodiments described herein. Rather, such terminology is simply used in a relative sense to consistently describe a structure as it exists in any one particular orientation and as illustrated herein.

Turning now to the figures, FIG. 1 illustrates plan views of an example integrated circuit (IC) die having a trojan rogue wire connection observable through an IC porthole using post-fabrication optical inspection, in accordance with an embodiment of the present disclosure. As can be seen, an IC die 104 can be of a security-critical IC 102. Security-critical IC 102 may be an IC that includes security-critical components that may be the target of a fabrication-time attack. As such, in some example cases, security-critical IC 102 may be an IC of a central processing unit (CPU), a microcontroller, a digital signal processor (DSP), a system on a chip (SoC), an application-specific integrated circuit (ASIC), a Field-Programmable Gate Array (FPGA), Complex Instruction Set Computer (CISC), Reduced Instruction Set Computer (RISC), multi core, or any other digital or analog circuitry configured to interpret and/or to execute program instructions and/or to process data, whether loaded from memory or implemented directly in hardware. Outsourcing fabrication of such complex security-critical ICs 102 make them vulnerable to fabrication-time attacks.

Still referring to FIG. 1, IC die 104 may be a multi-layer structure of semiconducting material on which the functional components of security-critical IC 102 is fabricated. As shown, IC die 104 includes an IC die section 106. IC die section 106 is a section or portion of IC die 104 towards the outskirts of IC die 104. Specifically, IC die section 106 is a section at the top edge of IC die 104. As can be seen in the exploded view of IC die section 106, IC die section 106 includes an IC die sub-section 108. IC die sub-section 108 is a section or portion of IC die section 106 towards the bottom-right corner of IC die section 106. As shown in the exploded view of IC die subsection 108, IC die subsection 108 can include multiple IC portholes 110. For example, in the illustrated embodiment, IC die subsection 108 may be a section of IC die 104 that includes security-critical wires, and IC portholes 110 can be generated in the vicinity of or around the security-critical wires. Within a projection of a perimeter of each IC porthole 110, the security-critical wire (or security-critical wires) within a projection of a particular IC porthole 110 perimeter is routed such that the security-critical wire does not overlap any other wires, components, or metal fill in any metal or interconnect layer of IC die 104. Likewise, any other wire, component, or metal fill that may be in any metal or interconnect layer of IC die 104 is routed to not overlap the security-critical wire (or security-critical wires) within the projection of IC porthole 110 perimeter. The end result is that IC portholes 110 allow for or otherwise permit post-fabrication optical inspection of the security-critical wires within IC portholes 110 due to the translucent nature of the interlayer dielectric materials in IC die 104. As will be appreciated in light of this disclosure, while a specific number of IC portholes are shown in FIG. 1 for illustration purposes, the claimed invention is not limited to any particular number of IC portholes. Rather, any appropriate number of IC portholes may be generated to permit post-fabrication optical inspection of security-critical wires within the projection of the respective perimeters of the generated IC portholes. Also, while the IC portholes are shown as being generated towards the outskirts of the IC die in FIG. 1 for illustration purposes, the placement or location of the IC portholes need not be so limited. Indeed, in some embodiments, a security-critical wire may be located towards the middle or center of the IC die and an IC porthole can be generated in the vicinity of or around such security-critical wire, for instance. As will be appreciated, numerous configurations can be implemented and the present disclosure is not intended to be limited to any particular one.

Figure 2:
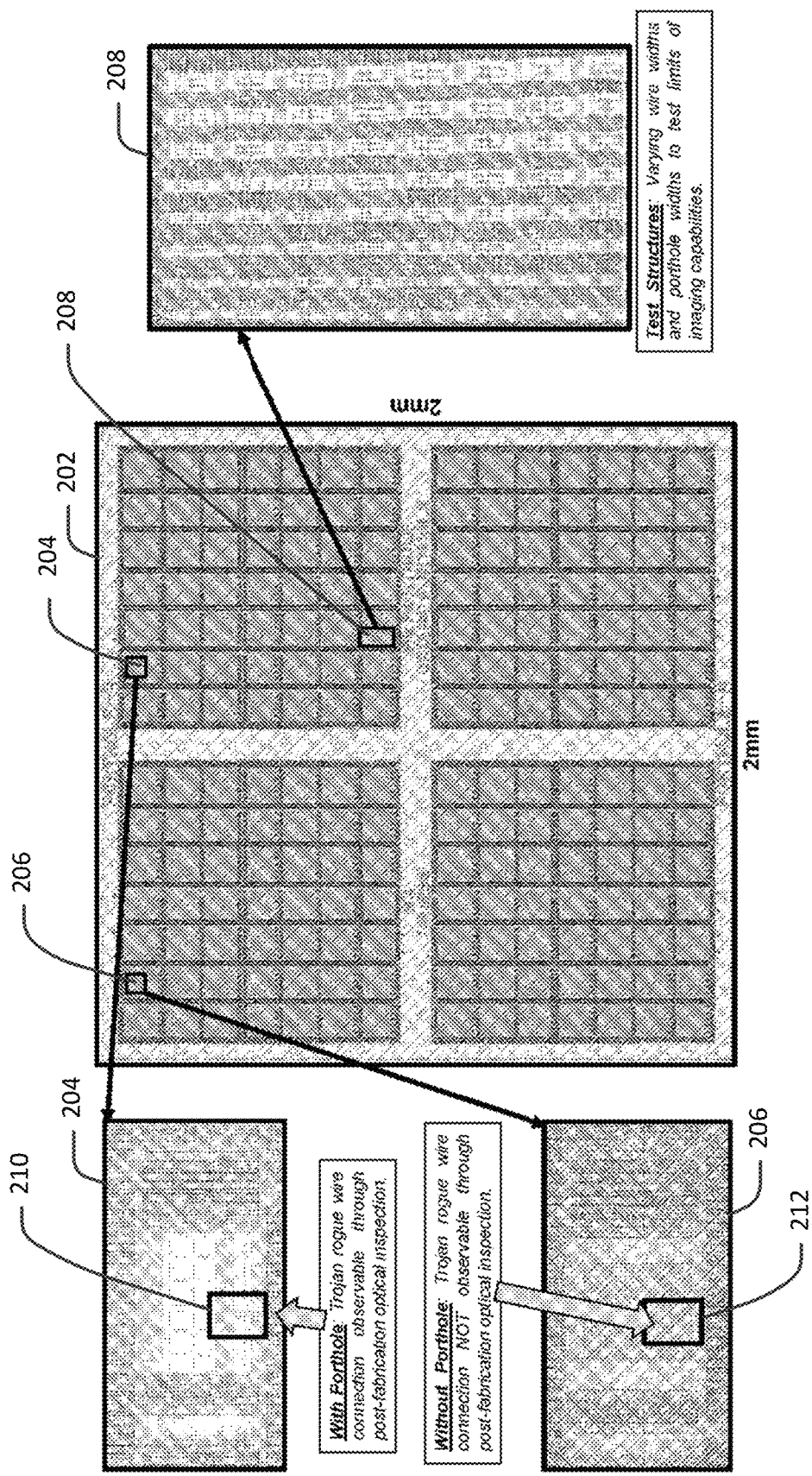
FIG. 2 illustrates plan views of an example IC die having multiple trojan rogue wire connections in multiple sections of the IC die, in accordance with an embodiment of the present disclosure.

FIG. 2 illustrates plan views of an example IC die having multiple trojan rogue wire connections in multiple sections of the IC die, in accordance with an embodiment of the present disclosure. As can be seen, an IC die 202 can be of a security-critical IC and include a first section 204 and a second section 206. For example, in the illustrated embodiment, first section 204 of IC die 202 may include one or more security-critical wires, and IC die 202 may have been maliciously modified during the fabrication process to include a trojan rogue wire connection to the security-critical wire in first section 204. Similarly, second section 206 of IC die 202 may also include one or more security-critical wires, and IC die 202 may have been maliciously modified during the fabrication process to include a trojan rogue wire connection to the security-critical wire in second section 206. As can be seen in the exploded view of first section 204, first section 204 includes an IC porthole 210 that allows for post-fabrication optical inspection and detection of the trojan rogue wire maliciously included in first section 204 of IC die 202. In contrast, as can be seen in the exploded view of second section 206, the trojan rogue wire maliciously included in a section 212 of second section 206 is not observable through post-fabrication optical inspection because of the lack of an IC porthole. That is, an IC porthole was not generated in or near section 212 of second section 206 during the design of IC die 202 and, as a result, an IC porthole is not present for post-fabrication optical inspection and detection of the trojan rogue wire maliciously included in second section 206 of IC die 202.

As can be seen, FIG. 2 also illustrates a plan view of a third section 208 of IC die 202 including multiple IC portholes having varying wire widths and porthole widths, in accordance with an embodiment of the present disclosure. For example, in some embodiments and as can be seen on the exploded view of third section 208, the widths of the security-critical wires may be varied to allow for post-fabrication optical inspection of the security-critical wires. In such embodiments, varying the width of a security-critical wire may result in or otherwise cause a need to appropriately vary the spacing surrounding the security-critical wire. For example, increasing the width of a wire decreases resistance and allows the wire to carry more current. When the spacing between the wider wire and an adjacent wire is not sufficient (e.g., too small), cross-coupling capacitance is increased, which results in an increase in cross-talk observed in the adjacent wire as a result of driving the wider wire (e.g., main wide wire). To compensate, manufacturing design rules may specify that spacing between adjacent wires increase when wire widths are increased.

In some embodiments, the width of a security-critical wire may need to be increased based on the capabilities of the available post-fabrication optical die imaging techniques. As explained above, this may cause a need to increase the spacing surrounding the security-critical wire. In an example implementation of the IC porthole concept in an IC die of an open source OpenRISC processor OR1200, the security-critical wire may be increased from a default width of 140 nanometers (nm) to about 350 nm, and the spacing surrounding the security-critical wire may be increased from about 160 nm to about 500 nm. As can be seen in the exploded view of third section 208, the respective dimensions of the IC portholes can be based on the dimension of the security-critical wire included within the IC porthole. For example, in the above example of the OpenRISC processor OR1200, the width or smaller dimension of the rectangle-shaped IC porthole can be a minimum of about 1.35 microns (i.e., 500 nm+500 nm+350 nm). It will be appreciated that, depending on the available process technology and optical imaging capabilities, a designer can make the wire width and spacings as small or large as desired. It will also be appreciated that reducing the wire and spacing widths, while still being able to image the wires through the IC portholes, reduces the area overhead of including IC portholes in an IC layout.

Figure 3:
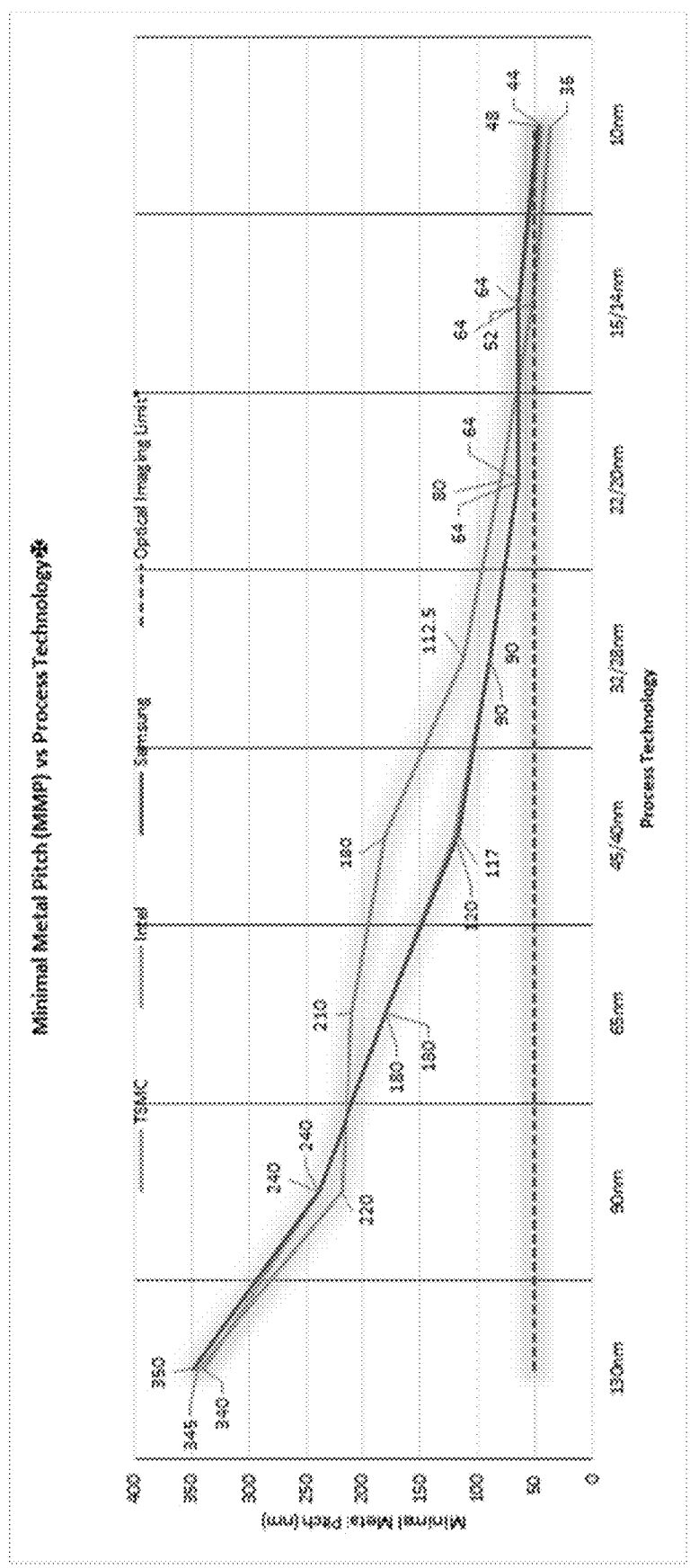
FIG. 3 graphically illustrates porthole scalability using a plot of process technology vs. minimal metal pitch (MMP), in accordance with an embodiment of the present disclosure.

FIG. 3 graphically illustrates porthole scalability using a plot of process technology vs. minimal metal pitch (MMP), in accordance with an embodiment of the present disclosure. It will be appreciated that MMP shrinks with process technology advancements. For example, and as can be seen in the plot of FIG. 3, as the process technology advances from 130 nm to 10 nm technology, the MMP shrinks from about 350 nm to in the range of about 36 nm to about 48 nm. The MMP defines the distance between the centers of two adjacent wires on the lowest routing layer for a given process technology. Namely, MMP=minimum wire width+minimum wire spacing, where the minimum wire spacing is between two adjacent IC wires. Note that at 10 to 14 nm. process nodes, the MMP is within the capabilities of optical imaging techniques, as indicated by the dashed line in the plot of FIG. 3. In some example cases, 50 nm feature resolution is possible with conventional optical scanning objectives. Note that only optical feature detection, and not resolution, is necessary to detect the presence of a rogue trojan wire within an IC porthole.

Figures 4, 4A:
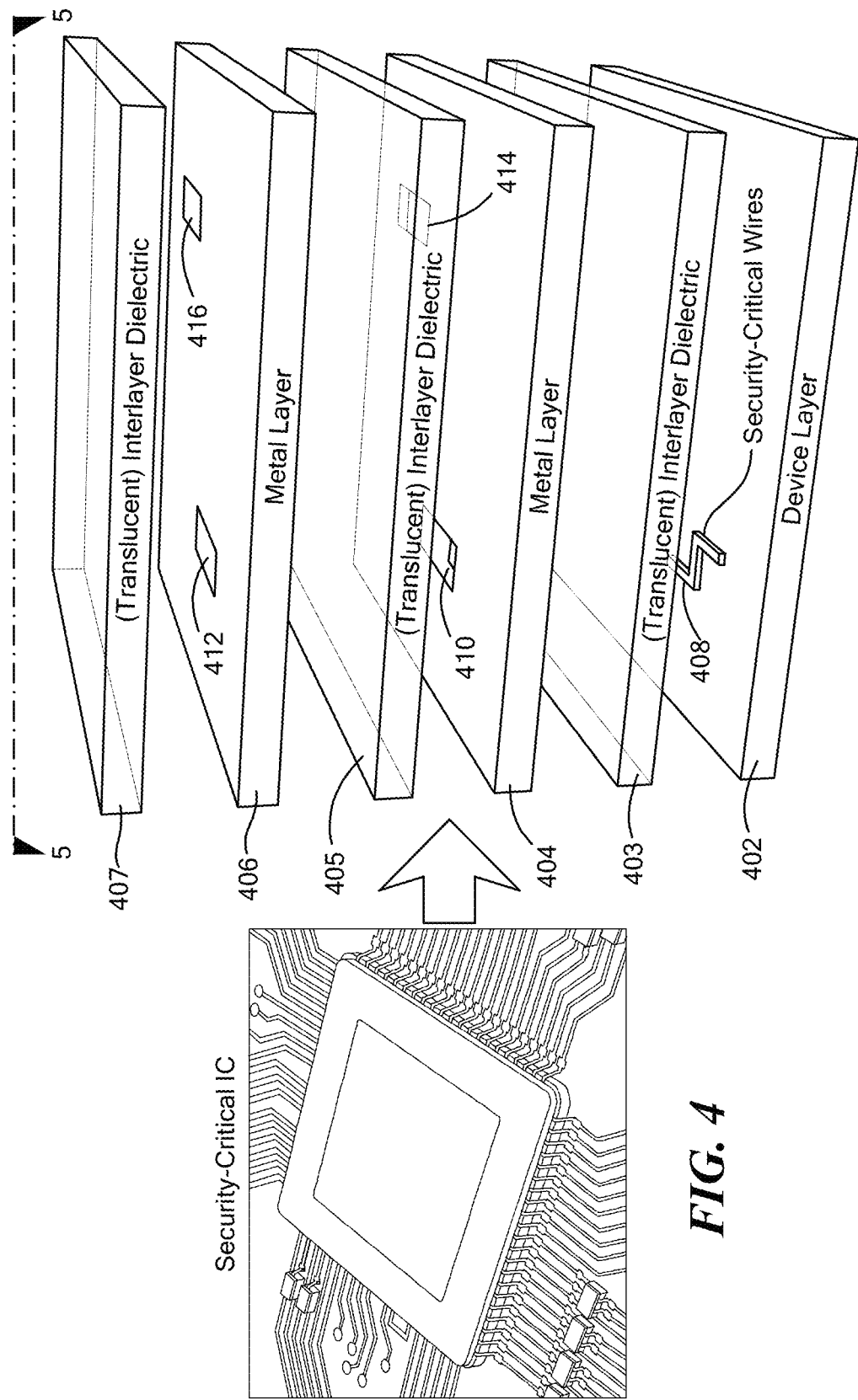
FIG. 4 illustrates a perspective view of an example security-critical IC having IC portholes provided therein, in accordance with an embodiment of the present disclosure.
FIG. 4A is an exploded perspective view of the security-critical IC of FIG. 4, in accordance with an embodiment of the present disclosure.

FIG. 4 illustrates a perspective view of an example security-critical IC having IC portholes provided therein, in accordance with an embodiment of the present disclosure. For example, the security-critical IC may be an IC such as security-critical IC 102 of FIG. 1.

FIG. 4A is an exploded perspective view of the security-critical IC of FIG. 4, in accordance with an embodiment of the present disclosure. Specifically, FIG. 4A shows a three-dimensional view of an integrated circuit structure of the security-critical IC of FIG. 4. As can be seen, the structure includes two metal structures or layers (404 and 406) in a vertically stacked arrangement above a device layer 402. For example, device layer 402 can include the circuit components (e.g., placement of the digital logic gates), and metal layers 404 and 406 can include the routing of the wires to connect the circuit components on the device layers, such as device layer 402, for example. In this context, a metal layer may include any signal layer that includes metal that may obstruct a security-critical wire from view during post fabrication optical inspection. An interlayer dielectric structure or layer separates each of the metal and device layers and can include the vias that are used to connect wires on adjacent layers. As can be seen, an interlayer dielectric layer 403 is formed above device layer 402 and separates device layer 402 and metal layer 404, and an interlayer dielectric layer 405 is formed above metal layer 404 and separates metal layer 404 and metal layer 406. In addition, an interlayer dielectric layer 407 is formed above metal layer 406. Although two distinct metal structures or layers are shown, other embodiments may have fewer metal layers or more metal layers, as will be appreciated.

As can be further seen in FIG. 4A, device layer 402 includes a security-critical wire 408 (e.g., security-critical wire 408 is included in or otherwise disposed on device layer 402). To allow for post-fabrication inspection of security-critical wire 408, an IC porthole is defined within the integrated circuit structure. In an embodiment, the IC porthole has a perimeter that defines a shape, such as, by way of example, circular, square, rectangular, oval, any regular geometric shape, or any irregular geometric shape, such that, when the perimeter of the IC porthole is projected onto a device layer, such as device layer 402, the projection of the IC porthole perimeter includes at least a segment of security-critical wire 408. For example, in one implementation, the IC porthole has a perimeter that defines a substantially rectangular shape. The substantially rectangular shape may follow the perimeter or outline of the segment of the security-critical wire being portholed. In particular, an IC porthole having a perimeter that defines a shape is defined in each of the device and metal layers such that, when the metal layers are stacked above the device layer, the projection of the IC porthole perimeters in each of the layers includes at least a segment the security-critical wire. In addition, the projections of the defined IC porthole perimeters are aligned or substantially aligned on top of one another when the metal layers are stacked above the device layer. Alignment of the projections of the IC porthole perimeters in the stacked layers allows for optical viewing of the included security-critical wire through the aligned IC portholes.

For example and as can be seen in FIG. 4A, an IC porthole 410 is defined in metal layer 404 to have a perimeter that defines a shape such that, when the perimeter of IC porthole 410 is projected onto device layer 402, the projection of IC porthole 410 perimeter includes at least a segment of security-critical wire 408. Similarly, an IC porthole 412 is defined in metal layer 406 to have a perimeter that defines a shape such that, when the perimeter of IC porthole 412 is projected onto device layer 402, the projection of IC porthole 412 includes at least a segment of security-critical wire 408. When metal layers 404 and 406 are stacked above device layer 402, the projections of the respective perimeters of IC portholes 410 and 412 are aligned on top of one another as well as a projection of a perimeter of an IC porthole (not shown) that is defined in device layer 402 to include at least a segment of security-critical wire 408. In device layer 402, the segment of security-critical wire 408 within perimeter of the defined IC porthole (not shown) can be routed such that security-critical wire 408 does not overlap any other wires, components, or metal fill. In metal layer 404, any metal fill and wiring within the perimeter of IC porthole 410 is positioned and/or routed such that they do not overlap security-critical wire 408. Similarly, in metal layer 406, any metal fill and wiring within the perimeter of IC porthole 412 is positioned and/or routed such that they do not overlap security-critical wire 408. The alignment of the projections of the respective perimeters of IC portholes 410 and 412 with the projection of the perimeter of the IC porthole (not shown) defined in device layer 402 to include at least a segment of security-critical wire 408 allows for post-fabrication optical inspection of security-critical wire 408 through IC portholes 410 and 412. Note that IC portholes need not be defined in the interlayer dielectric layers because of the translucent nature of the interlayer dielectric materials.

Also, as will be appreciated in light of this disclosure, additional IC portholes may be defined within the integrated circuit structure. For example, and as can be further seen in FIG. 4A, an IC porthole 414 is defined in metal layer 404 and an IC porthole 416 is defined in metal layer 406. IC portholes 414 and 416 have a respective perimeter that defines a shape such that, when the perimeters of IC portholes 414 and 416 are projected onto device layer 402, the projection of the respective perimeters of IC portholes 414 and 416 includes at least a segment of a security-critical wire (not shown) in device layer 402. This security-critical wire may be distinct from security-critical wire 408. When metal layers 404 and 406 are stacked above device layer 402, the projections of the respective perimeters of IC portholes 414 and 416 are aligned on top of one another such that optical viewing of the segment of the security-critical wire within the projections of the respective perimeters of IC portholes 414 and 416 is possible.

Figure 5:
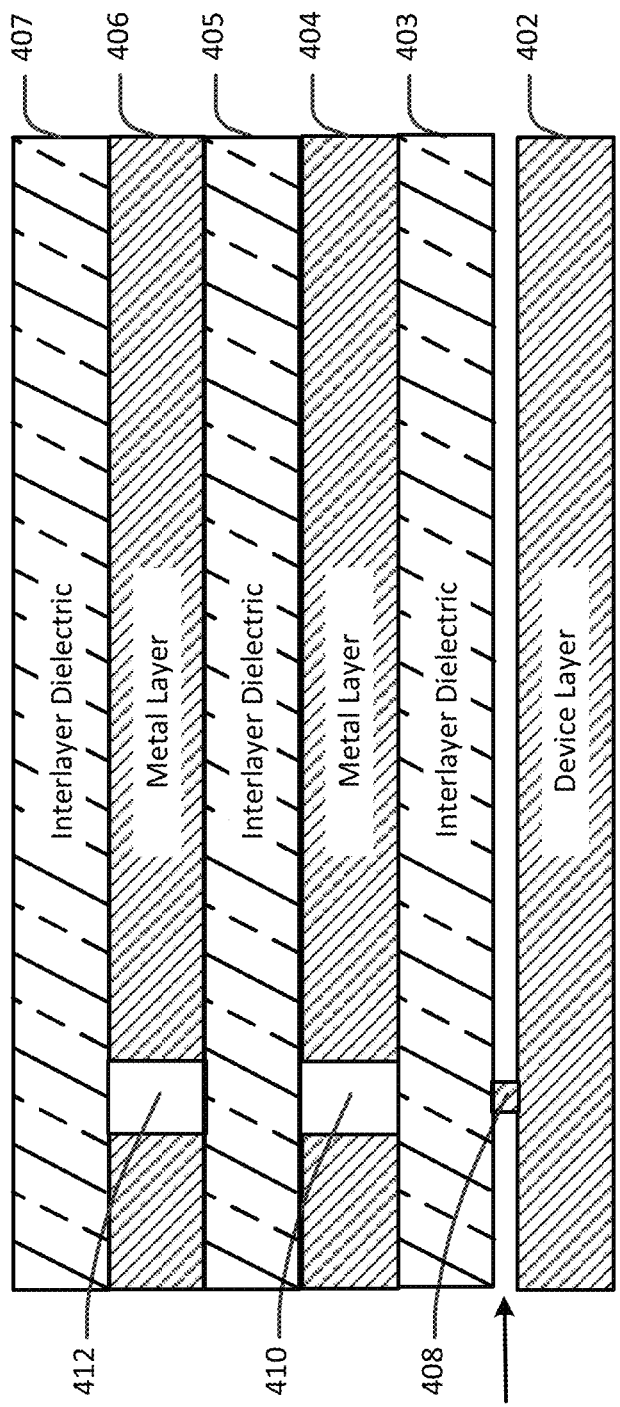
FIG. 5 is a cross-sectional view of the security-critical IC of FIGS. 4 and 4A having portholes provided therein taken across line 5-5 of FIG. 4A, in accordance with an embodiment of the present disclosure.

FIG. 5 is a cross-sectional view of the security-critical IC of FIGS. 4 and 4A having portholes provided therein taken across line 5-5 of FIG. 4A, in accordance with an embodiment of the present disclosure. Specifically, FIG. 5 shows the integrated circuit structure of the security-critical IC of FIGS. 4 and 4A taken across line 5-5 of FIG. 4A. As can be seen, when metal layers 404 and 406 are stacked above device layer 402, the projections of the respective perimeters of IC portholes 410 and 412 defined in respective metal layers 404 and 406 are aligned on top of one another above at least a segment of security-critical wire 408. Alignment of IC portholes 410 and 412 in a manner as to include at least a segment of security-critical wire 408 allows for post-fabrication optical viewing and inspection of security-critical wire 408 through IC portholes 410 and 412.

Figure 6B:
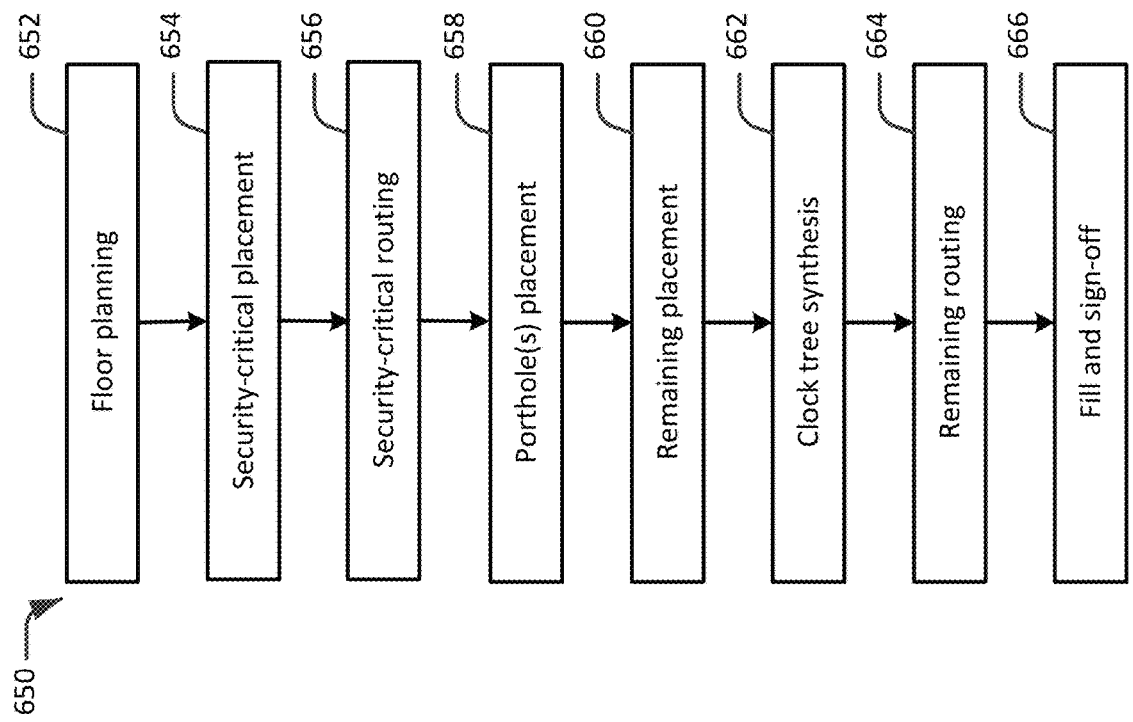
FIG. 6B is a flow diagram illustrating an example place-and-route (PaR) sub-process of the IC design process of FIG. 6A, in accordance with an embodiment of the present disclosure.
Figure 6A:
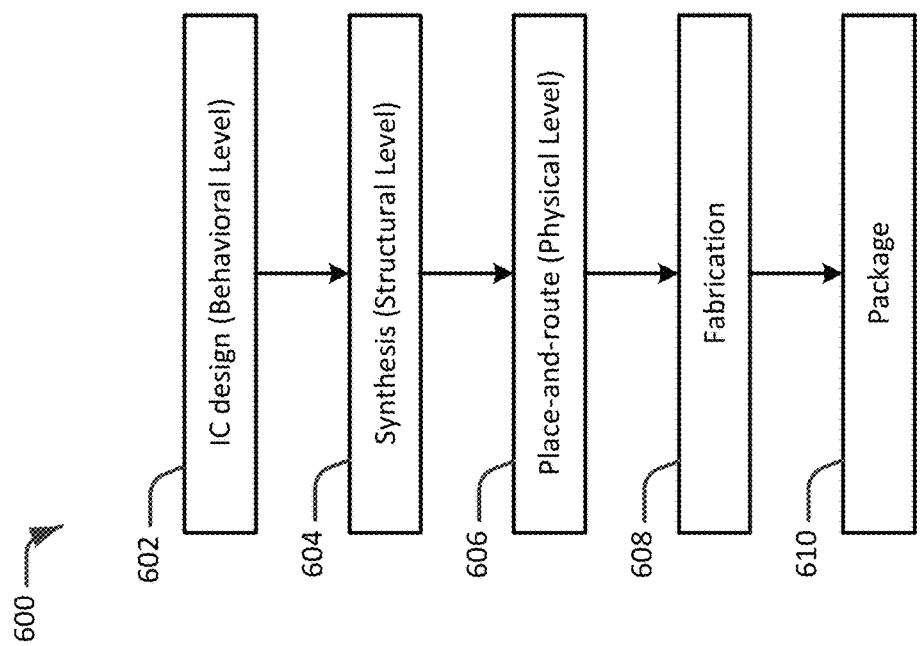
FIG. 6A is a flow diagram illustrating an example IC design process for designing an IC, in accordance with an embodiment of the present disclosure.

FIG. 6A is a flow diagram illustrating an example IC design process 600 for designing an IC, in accordance with an embodiment of the present disclosure. The embodiments disclosed herein, including process 600 and a sub-process 650 of FIG. 6B further described below, can be implemented using and/or in various forms of hardware, software, firmware, and/or special purpose processors. For example, in one embodiment, a non-transitory computer readable medium has instructions encoded thereon that, when executed by one or more processors, cause one or more of the IC design methodologies described herein to be implemented. The instructions can be encoded using any suitable programming language, such as C, C++, object-oriented C, JavaScript, Visual Basic .NET, BASIC, or alternatively, using custom or proprietary instruction sets. Such instructions can be provided in the form of one or more computer software applications that are tangibly embodied on a memory device, and that can be executed by a computer having any suitable architecture. In one embodiment, some of the operations of process 600 and the operations of sub-process 650 of FIG. 6B can be implemented, for example, using and/or as part of a Computer Aided Design (CAD) tool suitable for use in designing an IC. A computer system, such as a workstation, desktop computer, server, laptop, handheld computer, tablet computer (e.g., the iPad™ tablet computer), or other form of computing or telecommunications device that is capable of communication and that has sufficient processor power and memory capacity can then be used to execute the CAD tool and/or perform the operations described in this disclosure.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

With reference to process 600 of FIG. 6A, at operation 602, high-level descriptions of an IC are written. In one example implementation, the high-level description can be written using a suitable Hardware Description Language (HDL), such as Verilog or Very High Speed Integrated Circuits HDL (VHDL), to name two examples. Note that the written description is of an IC that is to be configured with one or more IC portholes.

At operation 604, the high-level descriptions of the IC are synthesized into a gate-level netlist. The netlist may include information regarding the electronic components used in the IC, cells used, interconnections, area used, as well as other details. The netlist may also include information regarding the constraints that are applied to ensure that the design satisfies the desired performance specifications (e.g., required functionality, speed, etc.). In the example implementation of the high-level descriptions of the IC being written using HDL, the HDL code can be "compiled" into a gate-level netlist.

At operation 606, the gate-level netlist is placed-and-routed (PaR) onto a physical layout, such as for example a physical geometric blueprint, of the IC. In brief, the placement phase of PaR includes determining where to place all the electronic components, circuitry, and logic elements in the layout, and the routing phase of PaR includes determining the exact design of all the wires needed to connect the placed components, circuitry, and logic elements. In one example implementation, the layout of the IC can be encoded in a Graphics Database System II (GDSII) file. The PaR sub-process is further described below with respect to FIG. 6B.

At operation 608, a semiconductor device fabrication is performed to create an IC die based on the layout of the IC (e.g., the layout encoded in a GDSII file).

At operation 610, the fabricated IC die is packaged or otherwise encapsulated in a supporting case that prevents physical damage and corrosion. The supporting case, which is also known as a "package", supports the electrical contacts which connect the device to a circuit board.

FIG. 6B is a flow diagram illustrating an example place-and-route (PaR) sub-process 650 of IC design process 600 of FIG. 6A, in accordance with an embodiment of the present disclosure. In brief, process 650 includes converting the circuit representations of the IC components (e.g., electronic components, circuitry, interconnects, etc.) into geometric representations (i.e., IC layout) of shapes which, when manufactured in the corresponding layers of materials, ensure the functioning of the components.

With reference to process 650, at operation 652, floor planning is performed to create a schematic representation of the tentative placement of the major functional blocks of the IC. For example, an IC floor plan may be generated that includes a core area and an input/output (I/O) pad ring surrounding the chip core area. The core area may include a placement grid, and circuit components may be placed and routed within the placement grid. Power and ground trees may be routed to provide power and/or ground rails to placement sites in the core area. The placement and routing may be optimized to adhere to design and performance objectives.

At operation 654, security-critical placement is performed to place the security-critical components (e.g., devices and/or standard cells connected to security-critical wires) on the placement grid. In an embodiment, the security-critical components may be placed within the placement grid in a manner that reduces and, in some cases, minimizes, routing wire lengths and power consumption, and increases performance.

At operation 656, security-critical routing is performed to connect the security-critical components. At operation 658, IC porthole(s) placement is performed. In an embodiment, IC porthole(s) placement may include placement of device placement blockage constraints (e.g., "keep-out" zones) on the device layer and routing blockage constraints (e.g., "keep-out" zones) on the routing metal layers above and below the segments of the security-critical wires and components that are being portholed. The security-critical wires and components may be marked or otherwise identified (e.g., marked as "fixed") to prevent movement of the security-critical wires and components during subsequent place and route operations.

At operation 660, remaining placement is performed to place the remaining non-security-critical cells (e.g., standard cells such as logic gates) within the core area. In an embodiment, the non-security-critical standard cells may be placed within the placement grid in a manner that reduces and, in some cases, minimizes, routing wire lengths and power consumption, and increases performance.

At operation 662, clock tree synthesis is performed to route and connect the clock tree to all sequential components in the IC design. Clock tree synthesis may include generating a balanced clock tree in such a manner as to, for example, reduce the skew and latency, maintain symmetrical clock tree structure and to cover the necessary components (e.g., devices that require clocks, such as flip-flops) in the design.

At operation 664, remaining routing is performed to connect the non-security-critical components. For example, wires may be routed between the standard cells.

At operation 666, the remaining (e.g., empty) placement sites may be filled with filler capacitor cells to achieve device uniformity. This may improve manufacturability and provide distributed decoupling capacitors to improve switching performance. Timing, design rules, and other verification tests may be run to ensure the IC device functions properly under the desired performance and operating margins.

Figure 7:
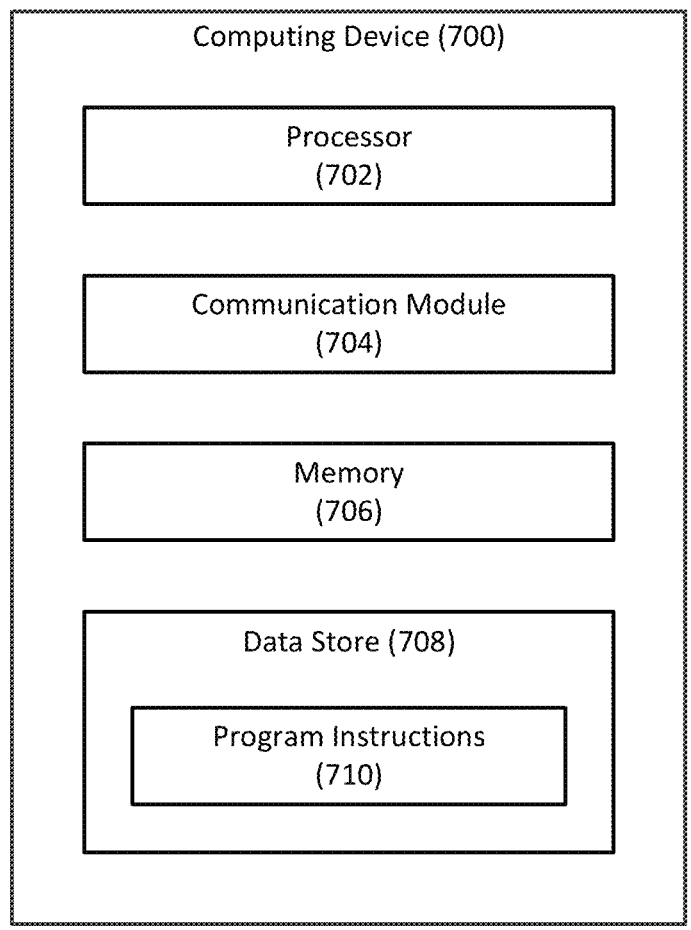
FIG. 7 illustrates selected components of an example computing device that may be used to perform any of the techniques as variously described in the present disclosure, in accordance with an embodiment of the present disclosure.

FIG. 7 illustrates selected components of an example computing device 700 that may be used to perform any of the techniques as variously described in the present disclosure, in accordance with an embodiment of the present disclosure. In some embodiments, computing device 700 may be configured to implement or direct one or more operations associated with some or all of the components and/or modules of a CAD tool suitable or otherwise configured to perform IC design process 600. For example, such CAD tools may be implemented in and/or using computing device 700. In one example case, for instance, such CAD tools may be stored on a data store 708, loaded in memory 706, and executable by a processor 702.

In some embodiments, computing device 700 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. In some embodiments, a distributed computational system may be provided comprising multiple of such computing devices. As shown in FIG. 7, computing device 700 includes processor 702, a communication module 704, memory 706, and data store 708. Processor 702, communication module 704, memory 706, and data store 708 may be communicatively coupled. In various embodiments, additional components (not illustrated, such as a display, communication interface, input/output interface, etc.) or a subset of the illustrated components can be employed without deviating from the scope of the present disclosure.

Processor 702 may be designed to control the operations of the various other components of computing device 700. Processor 702 may include any processing unit suitable for use in computing device 700, such as a single core or multi-core processor. In general, processor 702 may include any suitable special-purpose or general-purpose computer, computing entity, or computing or processing device including various computer hardware, or firmware, and may be configured to execute instructions, such as program instructions, stored on any applicable computer-readable storage media. For example, processor 702 may include a microprocessor, a central processing unit (CPU), a microcontroller, a digital signal processor (DSP), an application-specific integrated circuit (ASIC), a Field-Programmable Gate Array (FPGA), Complex Instruction Set Computer (CISC), Reduced Instruction Set Computer (RISC), multi core, or any other digital or analog circuitry configured to interpret and/or to execute program instructions and/or to process data, whether loaded from memory or implemented directly in hardware. Although illustrated as a single processor in FIG. 7, processor 702 may include any number of processors and/or processor cores configured to, individually or collectively, perform or direct performance of any number of operations described in the present disclosure.

In some embodiments, processor 702 may be configured to interpret and/or execute program instructions and/or process data stored in memory 706, data store 708, or memory 706 and data store 708. In some embodiments, processor 702 may fetch program instructions from data store 708 and load the program instructions in memory 706. After the program instructions are loaded into memory 706, processor 702 may execute the program instructions.

For example, in some embodiments, any one or more of the components and/or modules of the CAD tool suitable or otherwise configured to perform IC design process 600 or any of the other embodiments and/or examples described herein may be included in data store 708 as program instructions 710. For example, in such embodiments, program instructions 710 cause computing device 700 to implement functionality in accordance with the various embodiments and/or examples described herein. Processor 702 may fetch some or all of program instructions 710 from data store 708 and may load the fetched program instructions 710 in memory 706. Subsequent to loading the fetched program instructions 710 into memory 708, processor 702 may execute program instructions 710 such that the CAD tool runs on computing device 700 as variously described herein.

In some embodiments, virtualization may be employed in computing device 700 so that infrastructure and resources in computing device 700 may be shared dynamically. For example, a virtual machine may be provided to handle a process running on multiple processors so that the process appears to be using only one computing resource rather than multiple computing resources. Multiple virtual machines may also be used with one processor.

Communication module 704 can be any appropriate network chip or chipset which allows for wired or wireless communication via a network, such as, by way of example, a local area network (e.g., a home-based or office network), a wide area network (e.g., the Internet), a peer-to-peer network (e.g., a Bluetooth connection), or a combination of such networks, whether public, private, or both. Communication module 704 can also be configured to provide intra-device communications via a bus or an interconnect.

Memory 706 may include computer-readable storage media configured for carrying or having computer-executable instructions or data structures stored thereon. Such computer-readable storage media may include any available media that may be accessed by a general-purpose or special-purpose computer, such as processor 702. By way of example, and not limitation, such computer-readable storage media may include non-transitory computer-readable storage media including Random Access Memory (RAM), Dynamic Random Access Memory (DRAM), Synchronized Dynamic Random Access Memory (SDRAM), Static Random Access Memory (SRAM), non-volatile memory (NVM), or any other suitable storage medium which may be used to carry or store particular program code in the form of computer-executable instructions or data structures and which may be accessed by a general-purpose or special-purpose computer. Combinations of the above may also be included within the scope of computer-readable storage media.

Data store 708 may include any type of computer-readable storage media configured for short-term or long-term storage of data. By way of example, and not limitation, such computer-readable storage media may include a hard drive, solid-state drive, Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), non-volatile memory (NVM), or any other storage medium, including those provided above in conjunction with memory 706, which may be used to carry or store particular program code in the form of computer-readable and computer-executable instructions, software or data structures for implementing the various embodiments as disclosed herein and which may be accessed by a general-purpose or special-purpose computer. Combinations of the above may also be included within the scope of computer-readable storage media. Computer-executable instructions may include, for example, instructions and data configured to cause processor 702 to perform a certain operation or group of operations. Data store 708 may be provided on computing device 700 or provided separately or remotely from computing device 700.

The following examples pertain to further embodiments, from which numerous permutations and configurations will be apparent.

Example 1 includes an integrated circuit structure including: a device layer including a security-critical wire; and a metal layer disposed over the device layer, the metal layer including at least one wire and an IC porthole, the IC porthole having a perimeter that defines a shape such that when the perimeter of the IC porthole is projected onto the device layer, the projection of the IC porthole perimeter includes at least a segment of the security-critical wire, wherein the at least one wire in the metal layer does not overlap the security-critical wire within the projection of the IC porthole perimeter to thereby allow post-fabrication optical inspection of the security-critical wire through the IC porthole.

Example 2 includes the subject matter of Example 1, wherein the security-critical wire is a first security-critical wire, the IC porthole is a first IC porthole, and further including a second security-critical wire disposed on the device layer; and a second IC porthole defined in the metal layer, the second IC porthole having a perimeter that defines a shape such that when the perimeter of the second IC porthole is projected onto the device layer, the projection of the second IC porthole perimeter includes at least a segment of the second security-critical wire, wherein the at least one wire in the metal layer does not overlap the second security-critical wire within the projection of the second IC porthole perimeter to thereby allow post-fabrication optical inspection of the second security-critical wire through the second IC porthole.

Example 3 includes the subject matter of any of Examples 1 and 2, wherein the metal layer is a first metal layer, the at least one wire is a first wire, the IC porthole is a first IC porthole, and further including a second metal layer disposed over the device layer, the second metal layer including at least one second wire and a second IC porthole, the second IC porthole having a perimeter that defines a shape such that when the perimeter of the second IC porthole is projected onto the device layer, the projection of the second IC porthole perimeter includes at least a segment of the security-critical wire, wherein the at least one second wire in the second metal layer does not overlap the security-critical wire within the projection of the second IC porthole perimeter to thereby allow post-fabrication optical inspection of the security-critical wire through the first and second IC portholes.

Example 4 includes the subject matter of Example 3, wherein the second IC porthole is aligned on top of the first IC porthole.

Example 5 includes the subject matter of any of Examples 1 through 4, wherein the security-critical wire within the projection of the IC porthole perimeter is of an increased width to thereby allow post-fabrication optical inspection of the security-critical wire through the IC porthole.

Example 6 includes the subject matter of any of Examples 1 through 5, wherein spacing around the security-critical wire within the projection of the IC porthole perimeter is increased to thereby allow post-fabrication optical inspection of the security-critical wire through the IC porthole.

Example 7 includes the subject matter of any of Examples 1 through 6, wherein the IC porthole perimeter is defined to include the security-critical wire.

Example 8 includes the subject matter of any of Examples 1 through 7, wherein the metal layer includes a metal fill, and further wherein the metal fill does not overlap the security-critical wire within the projection of the IC porthole perimeter to thereby allow post-fabrication optical inspection of the security-critical wire through the IC porthole.

Example 9 includes the subject matter of any of Examples 1 through 8, wherein the post-fabrication optical inspection is non-destructive.

Example 10 includes a method for forming an integrated circuit (IC) structure, the method including: providing a device layer including a security-critical wire; and forming a metal layer over the device layer, the metal layer including at least one wire and an IC porthole, the IC porthole having a perimeter that defines a shape such that when the perimeter of the IC porthole is projected onto the device layer, the projection of the IC porthole perimeter includes at least a segment of the security-critical wire, wherein the at least one wire in the metal layer does not overlap the security-critical wire within the projection of the IC porthole perimeter to thereby allow post-fabrication optical inspection of the security-critical wire through the IC porthole.

Example 11 includes the subject matter of Example 10, wherein the security-critical wire is a first security-critical wire, the IC porthole is a first IC porthole, and the method further including: providing a second security-critical wire disposed on the device layer; and defining a second IC porthole in the metal layer, the second IC porthole having a perimeter that defines a shape such that when the perimeter of the second IC porthole is projected onto the device layer, the projection of the second IC porthole perimeter includes at least a segment of the second security-critical wire, wherein the at least one wire in the metal layer does not overlap the second security-critical wire within the projection of the second IC porthole perimeter to thereby allow post-fabrication optical inspection of the second security-critical wire through the second IC porthole.

Example 12 includes the subject matter of any of Examples 10 and 11, wherein the metal layer is a first metal layer, the at least one wire is a first wire, the IC porthole is a first IC porthole, and the method further including disposing second metal layer over the device layer, the second metal layer including at least one second wire and a second IC porthole, the second IC porthole having a perimeter that defines a shape such that when the perimeter of the second IC porthole is projected onto the device layer, the projection of the second IC porthole perimeter includes at least a segment of the security-critical wire, wherein the at least one second wire in the second metal layer does not overlap the security-critical wire within the projection of the second IC porthole perimeter to thereby allow post-fabrication optical inspection of the security-critical wire through the first and second IC portholes.

Example 13 includes the subject matter of Example 12, wherein the second IC porthole is aligned on top of the first IC porthole.

Example 14 includes the subject matter of any of Examples 10 through 13, wherein the security-critical wire within the projection of the IC porthole perimeter is of an increased width to thereby allow post-fabrication optical inspection of the security-critical wire through the IC porthole.

Example 15 includes the subject matter of any of Examples 10 through 14, wherein spacing around the security-critical wire within the projection of the IC porthole perimeter is increased to thereby allow post-fabrication optical inspection of the security-critical wire through the IC porthole.

Example 16 includes the subject matter of any of Examples 10 through 15, wherein the IC porthole is defined to include the security-critical wire.

Example 17 includes the subject matter of any of Examples 10 through 16, wherein the metal layer includes a metal fill, and further wherein the metal fill does not overlap the security-critical wire within the projection of the IC porthole perimeter to thereby allow post-fabrication optical inspection of the security-critical wire through the IC porthole.

Example 18 includes the subject matter of any of Examples 10 through 17, wherein the post-fabrication optical inspection is non-destructive.

Example 19 includes an integrated circuit (IC) structure including: a device layer including a security-critical wire; and one or more metal and interlayer dielectric layers disposed over the device layer, each metal layer including at least one wire and an IC porthole, the IC porthole in each metal layer having a perimeter that defines a shape such that when the perimeter of the IC porthole is projected onto the device layer, the projection of the IC porthole perimeter includes a segment of the security-critical wire, wherein the at least one wire in each metal layer does not overlap the security-critical wire within the projection of the IC porthole perimeter defined in each metal layer to thereby allow post-fabrication optical inspection of the security-critical wire through the IC porthole defined in each metal layer.

Example 20 includes the subject matter of Example 19, wherein the security-critical wire is a first security-critical wire, the IC porthole in each metal layer is a first IC porthole, and further including: a second security-critical wire disposed on the device layer; and a second IC porthole defined in each metal layer, the second IC porthole in each metal layer having a perimeter that defines a shape such that when the perimeter of the second IC porthole is projected onto the device layer, the projection of the second IC porthole perimeter includes at least a segment of the second security-critical wire, wherein the at least one wire in each metal layer does not overlap the second security-critical wire within the projection of the second IC porthole perimeter defined in each metal layer to thereby allow post-fabrication optical inspection of the second security-critical wire through the second IC porthole defined in each metal layer.

Example 21 includes the subject matter of any of Examples 19 and 20, wherein the security-critical wire is routed such that, within the projection of the IC porthole perimeter, the security-critical wire does not overlap any other wires, components, or metal fill in the IC structure.

Example 22 includes the subject matter of any of Examples 19 through 21, wherein the security-critical wire within the projection of the IC porthole perimeter is of an increased width to thereby allow post-fabrication optical inspection of the security-critical wire through the IC porthole.

Example 23 includes the subject matter of any of Examples 19 through 22, wherein spacing around the security-critical wire within the projection of the IC porthole perimeter is increased to thereby allow non-destructive post-fabrication optical inspection of the security-critical wire through the IC porthole.

Example 24 includes the subject matter of any of Examples 19 through 23, wherein the projection of the IC porthole perimeters in each metal layer is defined to include a segment of the security-critical wire.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. An integrated circuit (IC) structure, comprising:
   a device layer including a security-critical wire; and
   a metal layer disposed over the device layer, the metal layer including at least one wire and an IC porthole, the IC porthole having a perimeter that defines a shape such that when the perimeter of the IC porthole is projected onto the device layer, the projection of the IC porthole perimeter includes at least a segment of the security-critical wire, wherein the at least one wire in the metal layer does not overlap the security-critical wire within the projection of the IC porthole perimeter to thereby allow post-fabrication optical inspection of the security-critical wire through the IC porthole.

2. The IC structure of claim 1, wherein the security-critical wire is a first security-critical wire, the IC porthole is a first IC porthole, and further comprising:
   a second security-critical wire disposed on the device layer; and a second IC porthole defined in the metal layer, the second IC porthole having a perimeter that defines a shape such that when the perimeter of the second IC porthole is projected onto the device layer, the projection of the second IC porthole perimeter includes at least a segment of the second security-critical wire, wherein the at least one wire in the metal layer does not overlap the second security-critical wire within the projection of the second IC porthole perimeter to thereby allow post-fabrication optical inspection of the second security-critical wire through the second IC porthole.

3. The IC structure of claim 1, wherein the metal layer is a first metal layer, the at least one wire is a first wire, the IC porthole is a first IC porthole, and further comprising:

a second metal layer disposed over the device layer, the second metal layer including at least one second wire and a second IC porthole, the second IC porthole having a perimeter that defines a shape such that when the perimeter of the second IC porthole is projected onto the device layer, the projection of the second IC porthole perimeter includes at least a segment of the security-critical wire, wherein the at least one second wire in the second metal layer does not overlap the security-critical wire within the projection of the second IC porthole perimeter to thereby allow post-fabrication optical inspection of the security-critical wire through the first and second IC portholes.

4. The IC structure of claim 3, wherein the second IC porthole is aligned on top of the first IC porthole.

5. The IC structure of claim 1, wherein the security-critical wire within the projection of the IC porthole perimeter is of an increased width to thereby allow post-fabrication optical inspection of the security-critical wire through the IC porthole.

6. The IC structure of claim 1, wherein spacing around the security-critical wire within the projection of the IC porthole perimeter is increased to thereby allow post-fabrication optical inspection of the security-critical wire through the IC porthole.

7. The IC structure of claim 1, wherein the IC porthole perimeter is defined to include the security-critical wire.

8. The IC structure of claim 1, wherein the metal layer includes a metal fill, and further wherein the metal fill does not overlap the security-critical wire within the projection of the IC porthole perimeter to thereby allow post-fabrication optical inspection of the security-critical wire through the IC porthole.

9. A method for forming an integrated circuit (IC) structure, the method comprising:

providing a device layer including a security-critical wire; and forming a metal layer over the device layer, the metal layer including at least one wire and an IC porthole, the IC porthole having a perimeter that defines a shape such that when the perimeter of the IC porthole is projected onto the device layer, the projection of the IC porthole perimeter includes at least a segment of the security-critical wire, wherein the at least one wire in the metal layer does not overlap the security-critical wire within the projection of the IC porthole perimeter to thereby allow post-fabrication optical inspection of the security-critical wire through the IC porthole.

10. The method of claim 9, wherein the security-critical wire is a first security-critical wire, the IC porthole is a first IC porthole, and the method further comprising:

providing a second security-critical wire disposed on the device layer; and defining a second IC porthole in the metal layer, the second IC porthole having a perimeter that defines a shape such that when the perimeter of the second IC porthole is projected onto the device layer, the projection of the second IC porthole perimeter includes at least a segment of the second security-critical wire, wherein the at least one wire in the metal layer does not overlap the second security-critical wire within the projection of the second IC porthole perimeter to thereby allow post-fabrication optical inspection of the second security-critical wire through the second IC porthole.

11. The method of claim 9, wherein the metal layer is a first metal layer, the at least one wire is a first wire, the IC porthole is a first IC porthole, and the method further comprising:

disposing second metal layer over the device layer, the second metal layer including at least one second wire and a second IC porthole, the second IC porthole having a perimeter that defines a shape such that when the perimeter of the second IC porthole is projected onto the device layer, the projection of the second IC porthole perimeter includes at least a segment of the security-critical wire, wherein the at least one second wire in the second metal layer does not overlap the security-critical wire within the projection of the second IC porthole perimeter to thereby allow post-fabrication optical inspection of the security-critical wire through the first and second IC portholes.

12. The method of claim 11, wherein the second IC porthole is aligned on top of the first IC porthole.

13. The method of claim 9, wherein the security-critical wire within the projection of the IC porthole perimeter is of an increased width to thereby allow post-fabrication optical inspection of the security-critical wire through the IC porthole.

14. The method of claim 9, wherein spacing around the security-critical wire within the projection of the IC porthole perimeter is increased to thereby allow post-fabrication optical inspection of the security-critical wire through the IC porthole.

15. The method of claim 9, wherein the IC porthole perimeter is defined to include the security-critical wire.

16. The method of claim 9, wherein the metal layer includes a metal fill, and further wherein the metal fill does not overlap the security-critical wire within the projection of the IC porthole perimeter to thereby allow post-fabrication optical inspection of the security-critical wire through the IC porthole.

17. An integrated circuit (IC) structure, comprising:
a device layer including a security-critical wire; and
one or more metal and interlayer dielectric layers disposed over the device layer, each metal layer including at least one wire and an IC porthole, the IC porthole in each metal layer having a perimeter that defines a shape such that when the perimeter of the IC porthole is projected onto the device layer, the projection of the IC porthole perimeter includes a segment of the security-critical wire, wherein the at least one wire in each metal layer does not overlap the security-critical wire within the projection of the IC porthole perimeter defined in each metal layer to thereby allow post-fabrication optical inspection of the security-critical wire through the IC porthole defined in each metal layer.

18. The IC structure of claim 17, wherein the security-critical wire is a first security-critical wire, the IC porthole in each metal layer is a first IC porthole, and further comprising:
- a second security-critical wire disposed on the device layer; and
- a second IC porthole defined in each metal layer, the second IC porthole in each metal layer having a perimeter that defines a shape such that when the perimeter of the second IC porthole is projected onto the device layer, the projection of the second IC porthole perimeter includes at least a segment of the second security-critical wire, wherein the at least one wire in each metal layer does not overlap the second security-critical wire within the projection of the second IC porthole perimeter defined in each metal layer to thereby allow post-fabrication optical inspection of the second security-critical wire through the second IC porthole defined in each metal layer.

19. The IC structure of claim 17, wherein the security-critical wire is routed such that, within the projection of the IC porthole perimeter, the security-critical wire does not overlap any other wires, components, or metal fill in the IC structure.

20. The IC structure of claim 17, wherein the security-critical wire within the projection of the IC porthole perimeter is of an increased width to thereby allow post-fabrication optical inspection of the security-critical wire through the IC porthole.

* * * * *